(12) United States Patent
Boemmels et al.

(10) Patent No.: US 8,176,764 B2
(45) Date of Patent: May 15, 2012

(54) TERMINATION TOOL

(75) Inventors: Bryan Boemmels, Branford, CT (US); John Gogol, Wolcott, CT (US); David Medeiros, Watertown, CT (US); Charlie Maynard, Watertown, CT (US)

(73) Assignee: The Siemon Company, Watertown, CT (US)

( * ) Notice: Subject to any disclaimer, the term of this patent is extended or adjusted under 35 U.S.C. 154(b) by 989 days.

(21) Appl. No.: 12/129,747

(22) Filed: May 30, 2008

(65) Prior Publication Data

US 2008/0295565 A1 Dec. 4, 2008

Related U.S. Application Data

(60) Provisional application No. 60/941,306, filed on Jun. 1, 2007.

(51) Int. Cl.
*B21D 37/10* (2006.01)

(52) U.S. Cl. ............. 72/416; 72/399; 72/402; 72/482.6; 72/712; 29/751

(58) Field of Classification Search .................... 72/412, 72/414, 416, 402, 712, 479, 482.6, 399, 400; 29/751, 863, 282
See application file for complete search history.

(56) References Cited

U.S. PATENT DOCUMENTS

| | | | | |
|---|---|---|---|---|
| 2,878,698 A | * | 3/1959 | Senrynck | 72/409.01 |
| 3,154,981 A | * | 11/1964 | McDurmont | 72/402 |
| 3,156,139 A | * | 11/1964 | Willis | 72/402 |
| 4,261,194 A | * | 4/1981 | Stephens | 72/402 |
| 5,007,280 A | * | 4/1991 | Quinn et al. | 72/402 |
| 5,040,867 A | | 8/1991 | De Jong et al. | |
| 5,113,474 A | | 5/1992 | Slaney et al. | |
| 5,261,020 A | | 11/1993 | De Jong et al. | |
| 5,477,608 A | * | 12/1995 | Woll | 29/753 |

(Continued)

FOREIGN PATENT DOCUMENTS

DE 103 43 864 4/2005

OTHER PUBLICATIONS

International Search Report with Written Opinion, PCT/US2008/065264, Date mailed Dec. 23, 2008, Search Report having 8 pages, Written Opinion having 7 pages.

(Continued)

*Primary Examiner* — Edward Tolan
(74) *Attorney, Agent, or Firm* — Cantor Colburn LLP

(57) ABSTRACT

Disclosed is a termination tool and a method for securing a connector to a cable. The termination tool includes a holder receivable of the connector and a push block slideably located in the termination tool. The push block is capable of forming at least one axial crimp in the connector when the push block is articulated along a connector axis toward the holder. At least two crimp dies are rotably fixed to the termination tool and are capable of forming at least one transverse crimp in the connector when the at least two crimp dies are moved toward the connector axis. A lever is in operable communication with the push block and the at least two crimp dies. The lever is capable of urging the push block along the connector axis toward the holder and the at least two crimp dies toward the connector axis to form both the at least one axial crimp and the at least one transverse crimp.

11 Claims, 3 Drawing Sheets

U.S. PATENT DOCUMENTS 6,000,857 A   12/1999 Rondeau
6,484,385 B2 * 11/2002 Ellis .............................. 29/517
7,228,624 B2 *  6/2007 Culp .............................. 29/861

OTHER PUBLICATIONS

International Preliminary Report, PCT/US2008/065264, Dec. 10, 2009.

Tyco Electronics Corporation, "AMP LightCrimp* Plus SC Simplex Connector Kits 492643-[], 1278079-[], 1588291-[], and 1693276-1", Instruction Sheet 408-4471, Feb. 10, 2005 Rev F, pp. 1-19, Tyco Electronics Corporation, Harrisburg, PA.

Tyco Electronics Corporation, "AMP LightCrimp* Plus ST*-Style Connector Kits 492642-[] and 1278082-[]", Instruction Sheet 408-4457, May 13, 2002, pp. 1-19, Tyco Electronics Corporation, Harrisburg, PA.

Amp Incorporated, "Hand Tool Frame Assembly 585324-[], 58555-[], and 58588-[]", Instruction Sheet 408-4020, Nov. 28, 1995 Rev A, pp. 1-4, AMP Incorporated, Harrisburg, PA.

* cited by examiner

TERMINATION TOOL

CROSS REFERENCE TO RELATED APPLICATION

The present application claims priority to U.S. Provisional Patent Application Ser. No. 60/941,306, filed Jun. 1, 2007, the entire contents of which are specifically incorporated herein by reference.

BACKGROUND OF THE INVENTION

The present invention relates generally to fiber or copper connector applications. More specifically, this invention relates to a termination tool for fiber or copper connector applications.

There are several methods for terminating connectors to fiber optic cable. The appropriate method depends on the structure of the connector used. One type of connector is attached to the cable with an epoxy and then the end is polished with a polishing film. Another type, a "crimp connector" or "mechanical splice connector", is secured to the cable by crimping the connector, containing a pre-polished piece of fiber, to the fiber cable, thus eliminating the need for epoxy.

The termination process for one type of crimp connectors involves positioning the connector and the cable in a cable holder and inserting an end of the cable into a plunger of the connector. While holding the cable holder containing the connector and cable, the technician then uses a crimp tool to crimp the connector to the cable. For certain LC, SC, and ST-type fiber crimp connectors, two crimping operations are required to affix the connector to the cable. A first crimp operation is performed collinear to the central axis of the connector. A second crimp operation is performed transverse to the central axis of the connector.

There are several limitations of the above-described termination process. First, two separate crimping processes are required to terminate each connector. The separate crimping processes significantly increase the time required to terminate a connector. Second, because the cable holder and the crimp tool are separate tools, the crimping process requires two hands to complete, one to hold the cable holder and one to operate the crimp tool. Third, this termination process requires removal of a protective dust cap from the connector prior to the crimping operation. Removal of the dust cap exposes an endface of the connector, increasing the possibility of contamination of, or damage to, the connector endface, which could result in significant optical signal strength loss through the cable. Finally, each type of fiber connector, LC, SC, and ST, requires a unique die set be installed in the crimp tool to terminate the particular connector.

The art would well receive a versatile termination tool that would reduce termination time, and a termination process that would not require removal of the connector dust cap.

SUMMARY OF THE INVENTION

A termination tool for securing a connector to a cable includes a holder receivable of the connector and a push block slideably located in the termination tool. The push block is capable of forming at least one axial crimp in the connector when the push block is articulated along a connector axis toward the holder. At least two crimp dies are rotably fixed to the termination tool and are capable of forming at least one transverse crimp in the connector when the at least two crimp dies are moved toward the connector axis. A lever is in operable communication with the push block and the at least two crimp dies. The lever is capable of urging the push block along the connector axis toward the holder and the at least two crimp dies toward the connector axis to form both the at least one axial crimp and the at least one transverse crimp.

A method for securing a connector to a cable includes placing a connector in a holder of a termination tool and inserting a first end of the cable into the connector. A lever of the termination tool is articulating about a pivot urging a push block of the termination tool along a connector axis into contact with the connector via articulation of the lever thereby forming at least one axial crimp in the connector. Articulating the lever about the pivot further urges at least two crimp dies of the termination tool toward the connector axis into contact with the connector via articulation of the lever thereby forming at least one transverse crimp in the connector.

DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE INVENTION

Figure 1:
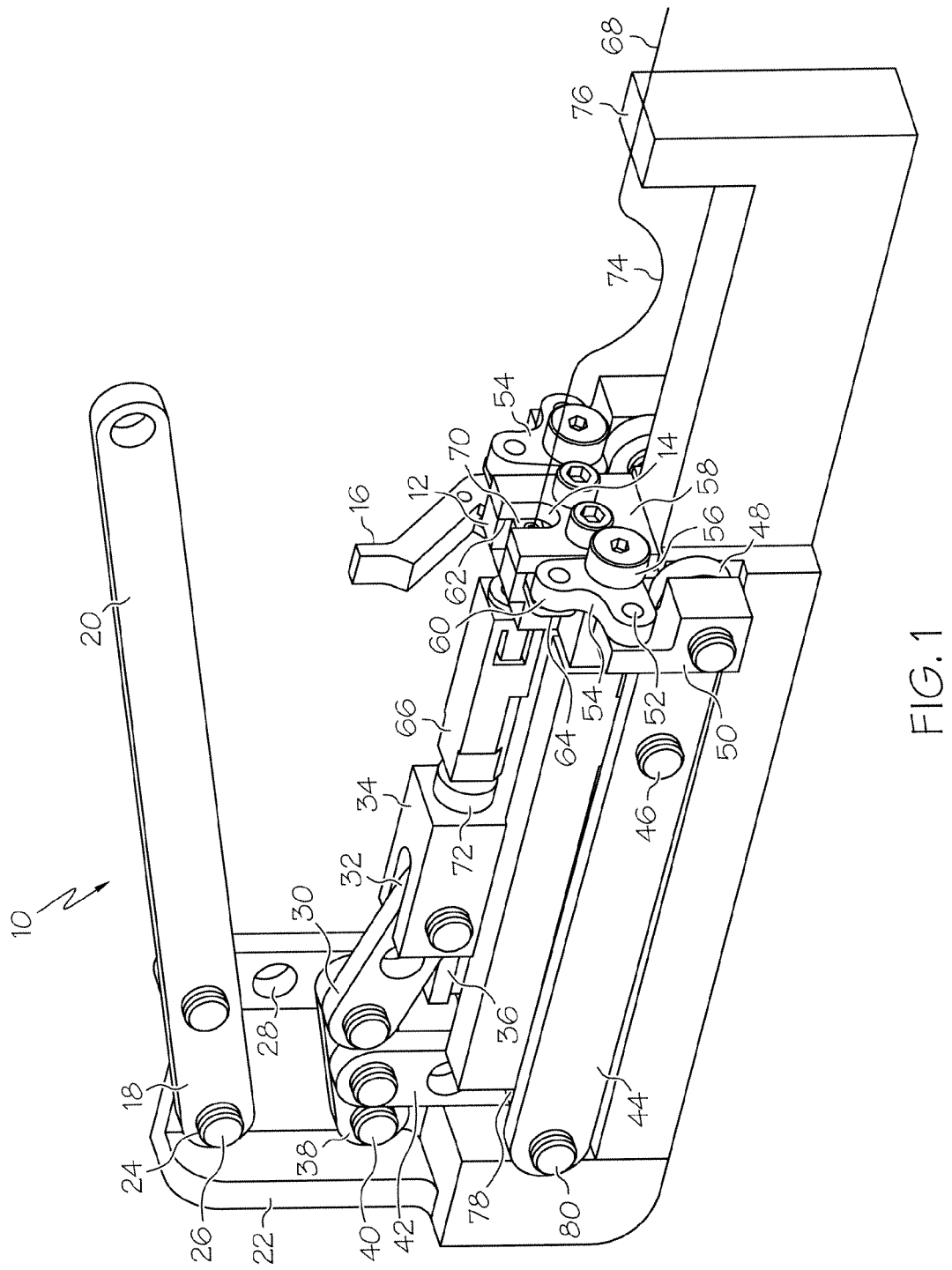
FIG. 1 is a perspective view of an embodiment of a crimp tool.

Shown in FIG. 1 is an embodiment of a termination tool 10. The termination tool 10 includes a holder 12 that has a V-grooved channel 14. A cover 16 is closeable over the holder 12. A fixed end 18 of a lever 20 is rotably attached to a frame 22 of the termination tool 10. The lever 20 is attached to the frame through a pivot hole 24 via a fastener 26. The fastener 26 allows the lever 20 to rotate relative to the frame 22 about the fastener 26. The lever 20 is also connected to a lever linkage 28 which, in turn, is connected to a knee portion 30. A first end 32 of the knee portion 30 is connected to a push block 34, which is disposed in a slot 36 in the frame 22. The slot 36 extends in an axial direction along the frame 22 and serves as a guide for the push block 34 along the axis of the termination tool 10. The slot 36 may be of any shape or combination of elements serving the previously described purpose.

A second end 38 of the knee portion 30 is fixed to the frame 22 at a frame pivot 40, and is additionally connected to a connecting link 42. It is to be appreciated that the connecting link 42 can be located at any position between the first end 32 and second end 38 of the knee portion 30 and attached or unattached to the knee portion 30. The connecting link 42 is additionally connected to at least one main linkage 44 that extends axially along the frame 22. The embodiment illustrated in FIG. 1 includes two main linkages 44, but it is to be appreciated that other quantities of main linkages 44 are contemplated within the scope of this invention. Each main linkage 44 is connected to the frame at a main pivot 46. A yoke end 48 of each main linkage 44 is connected to a yoke 50. The yoke 50 is, in turn connected to, or in operable communication with, a first leg 52 of an L-bracket 54. A vertex 56 of the L-bracket 54 is rotably connected to an end face 58 of a holder 12. A second leg 60 of the L-bracket 54 is connected to a crimp die 62, which is insertable through a guide 64 in the holder 12. In the embodiment shown in FIG. 1, the main linkages 44, yokes 50, L-brackets 54, and crimp dies 62 are configured and disposed such that the crimp dies 62 are slideable into the holder 12 and toward each other from diametrically opposed directions.

To crimp a connector 66 to a cable 68 in an axial direction, the connector 66 is inserted into the termination tool 10 so that a plunger 70 of the connector 66 is disposed in the V-grooved channel 14 of the holder 12, and a dust cap 72 of the connector 66 is disposed closest to the push block 34. The cover 16 is closed over the holder 12 to prevent unwanted movement of the connector 66 in the holder 12. A first end (not shown) of the cable 68 is inserted into the plunger 70 and extends from the plunger 70. The cable 68 in this embodiment is a fiber optic cable, but other cable materials, including copper, are contemplated within the scope of this invention. A bow shape 74 is formed in the cable 68 to act as a weak spring to keep the first end of the cable 68 inside of the plunger 70. The cable 68 is secured in a cable clamp 76 to keep the bow shape 74 in the cable 68.

The lever 20 is turned downward, forcing the lever link 28 to move in a downward direction which in causes the knee portion 30 to straighten. When the knee portion 30 straightens, the first end 32 which is connected to the push block 34 moves axially, pushing the push block 34 along the slot 36 and into contact with the dust cap 72 of the connector 66. As the push block 34 continues to traverse the slot 36, it exerts a force on the connector 66 through the dust cap 72, pushing the connector 66 in an axial direction with the plunger 70 being forced against the holder 12 resulting in a crimp of the plunger 70 in an axial direction. The dust cap 72 is configured to withstand the force applied by the push block 34 allowing the plunger 70 to be crimped in an axial direction while still protecting the connector 66 from contamination and not causing damage to the dust cap 72.

The termination tool 10 additionally crimps the plunger 70 to the cable 68 in a transverse direction substantially simultaneously with the above-described crimp in the axial direction. When the knee portion 30 straightens as described above, the second end 38 rotates about the frame pivot 40 pushing the connecting link 42 in a downward direction. The connecting link 42, in turn, rotates each main linkage 44 about each respective main pivot 46. The rotation of the main linkage 44 moves each yoke 50 in an upward direction, also moving each first leg 52 of each L-bracket 54 in an upward direction. As a result, the L-bracket 54 rotates about its vertex 56, and the second leg 60 rotates inward toward the plunger 70. As it rotates, the second leg 60 pushes the crimp die 62 through the guide 64 into contact with and exerts a force on the plunger 70. Acting in concert, the two or more crimp dies 62 exert forces on the plunger 70 in opposing directions and crimp the plunger 70 to the cable 68 in the transverse direction.

In alternative embodiments, it may be desired to delay the transverse crimp operation. To accomplish this, pin holes 78 in the connecting link 42 and/or the main linkage 44, through which a pin 80 is inserted to connect the connecting link 42 to the main linkages 44, may be configured as slots. When the lever 20 is lowered, straightening the knee portion 30, the second end 38 rotates about the frame pivot 40 pushing the connecting link 42 in a downward direction. Because the pin holes 78 are configured as slots, the connecting link 42 does not immediately begin to rotate the main linkages 44 about each respective main pivot 46 until the pin 80 bottoms out in the pin holes 78. This delay in the motion of the main linkages 44 results in a delay of the transverse crimp of the connector 66.

Figure 2:
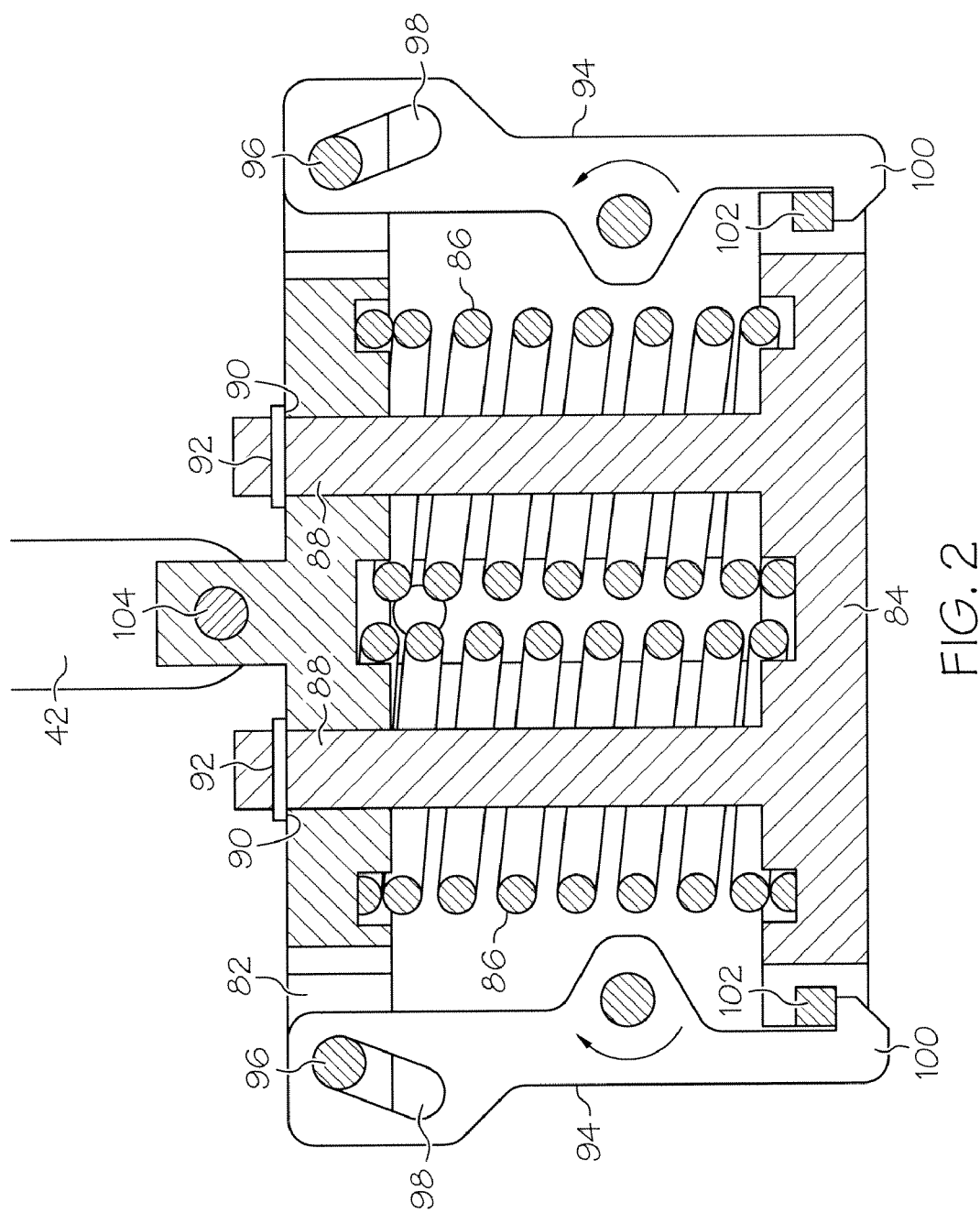
FIG. 2 is a partial cross-sectional view, shown in the collapsed position, of an addition to the overall mechanism design that allows for different starting times and speeds between the axial and transverse motions of the mechanism.

In another embodiment illustrated in FIG. 2, the frame 22 includes a top plate 82 and a bottom plate 84, with one or more springs 86 retained therebetween. One or more spring retention pins 88 extend from the bottom plate 84 and through a retainer hole 90 in the top plate 82. The spring retention pins 88 are retained in the retainer holes 90 by a retainer clip 92 or other means, retaining the top plate 82 to the bottom plate 84. The top plate 82 and bottom plate 84 are further connected by one or more latches 94. Each latch 94 is retained on the top plate 82 by a latch pin 96 extending through a cam slot 98 in the latch 94. A hook 100 of each latch 94 interlocks with a catch 102 disposed on the bottom plate 84 to retain the bottom plate 84 to the top plate 82. The latch pivots 106 are fixed relative to the frame 22, and control the locations of all moving component vertices.

Figure 3:
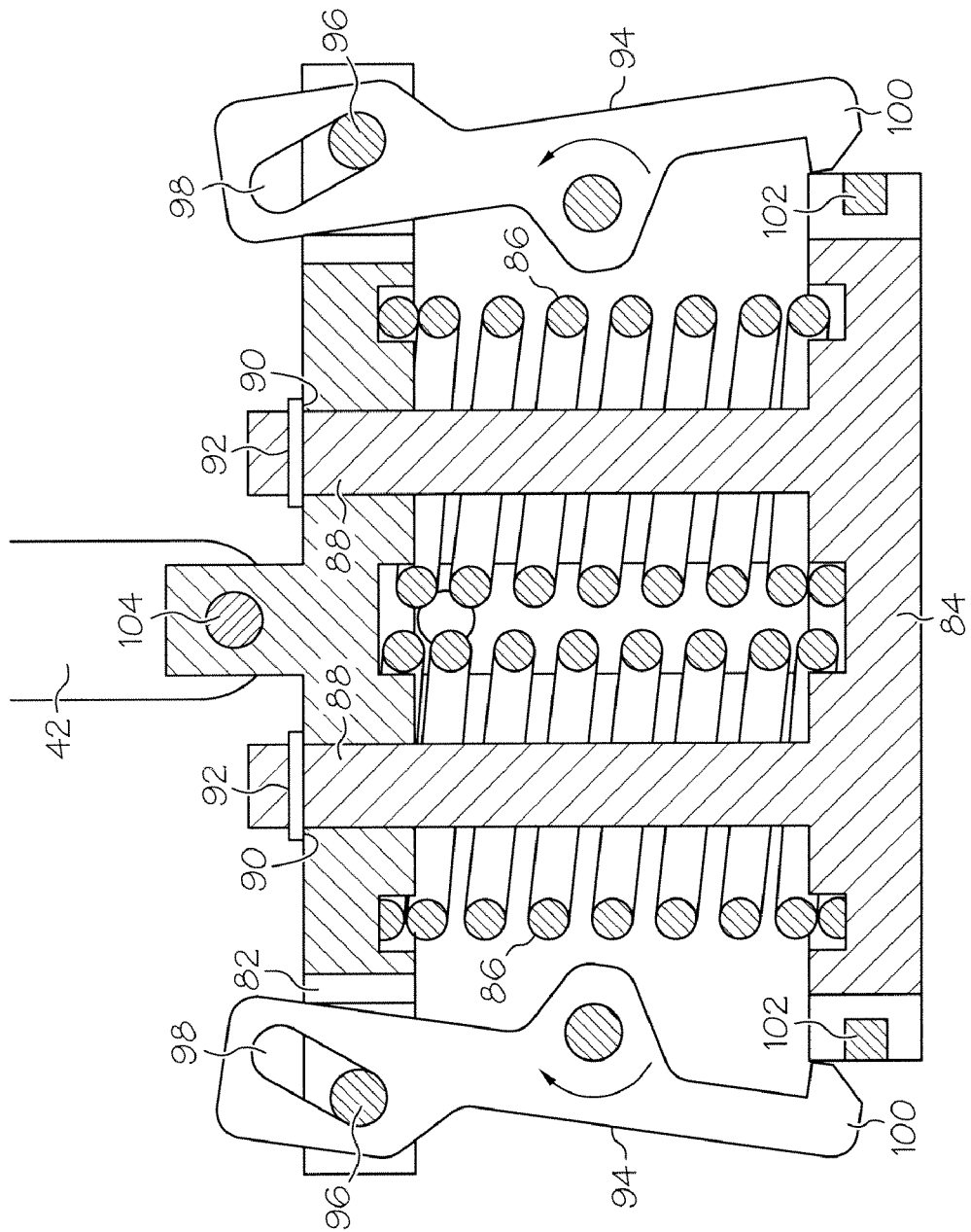
FIG. 3 is a partial cross sectional view, shown in the expanded position, of the mechanism shown in FIG. 2.

The connecting link 42 is connected to the top plate at a connecting hole 104, while the main linkages 44 are connected to the bottom plate 84. When the connecting link 42 is pushed vertically downward, the top plate 82 is pushed closer to the bottom plate 84 causing the springs 86 to compress. Additionally, as the top plate 82 moves downward, the latch pins 96 move downward in the cam slots 98 causing the hook 100 on each latch 94 to rotate outward. As shown in FIG. 3, when the hooks 100 rotate a sufficient distance outward, the catches 102 move past the hooks 100 and the bottom plate 84 moves downward causing the main links 44 to rotate about the main pivots 56 to initiate the transverse crimp of the connector 66 as described above. Utilizing the springs 86 and latches 94, allows the transverse crimp to be delayed by a desired length of time. Variations in the spring 86 forces can also allow variation in speed and force with which the transverse crimp is performed. Further, in some embodiments, the termination tool 10 is configured such that various types of connectors, for example, LC, SC, or ST connectors may be crimped utilizing the termination tool 10 without changing the configuration of crimp dies 62.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention.

The invention claimed is:

1. A termination tool for securing a connector to a cable comprising:
    a holder receiving the connector, the connector receiving the cable within a plunger along a connector axis;
    a push block slideably disposed in the termination tool, the push block forming at least one axial crimp parallel to the connector axis in the connector when the push block is articulated along the connector axis toward the holder to drive the connector;
    at least one crimp die disposed in the termination tool forming at least one transverse crimp in the connector within the holder when the at least one crimp die is moved toward the connector axis, the transverse crimp being formed on an axis perpendicular to the connector axis; and a lever in operable communication with the push block and the at least one crimp die, the lever urging the push block along the connector axis toward the holder and the at least one crimp dies toward the connector axis to form both the at least one axial crimp and the at least one transverse crimp without removing the connector from the holder.

2. The termination tool of claim 1 wherein the termination tool forms the at least one axial crimp and the at least one transverse crimp via a single movement of the lever.

3. The termination tool of claim 1 wherein the termination tool forms the at least one axial crimp and the at least one transverse crimp in multiple types of connectors without changing a configuration of the at least one crimp die.

4. The termination tool of claim 1 wherein the termination tool forms the at least one axial crimp and the at least one transverse crimp in the connector while a dust cap of the connector is in place.

5. The termination tool of claim 1 wherein the push block forms the at least one axial crimp in the plunger of the connector.

6. The termination tool of claim 5 wherein the push block forms the at least one axial crimp by pushing on a dust cap of the connector along the connector axis.

7. The termination tool of claim 1 wherein the push block is connected to the lever via at least one connecting link.

8. The termination tool of claim 1 wherein each crimp die is connected to the lever via at least one main link.

9. The termination tool of claim 8 including at least one L-bracket connecting each crimp die to the at least one main link.

10. The termination tool of claim 9 wherein each L-bracket is pivotably fixed to the termination tool at a vertex.

11. The termination tool of claim 9 wherein rotation of each L-bracket about the vertex urges each crimp die toward the connector axis to form the at the least one transverse crimp in the connector.

* * * * *